United States Patent [19]

Komiya

[11] Patent Number: 4,812,910
[45] Date of Patent: Mar. 14, 1989

[54] IMAGE REPRODUCING EQUIPMENT

[75] Inventor: Yutaka Komiya, Tokyo, Japan

[73] Assignee: Canon Kabushiki Kaisha, Tokyo, Japan

[21] Appl. No.: 224,257

[22] Filed: Jul. 26, 1988

Related U.S. Application Data

[63] Continuation of Ser. No. 937,505, Dec. 3, 1986, abandoned, which is a continuation of Ser. No. 219,976, Dec. 24, 1980, abandoned.

[30] Foreign Application Priority Data

Dec. 29, 1979 [JP] Japan .................. 54-173544
Feb. 15, 1980 [JP] Japan .................. 55-17400

[51] Int. Cl.$^4$ .............................. H04N 1/40
[52] U.S. Cl. .................... 358/282; 358/283; 382/9
[58] Field of Search ........... 358/282, 280, 283, 256, 358/293, 298; 382/9

[56] References Cited

U.S. PATENT DOCUMENTS 3,805,237 4/1974 Cobb et al. ................. 382/9
4,517,606 5/1985 Yokomizo et al. ............ 358/230

FOREIGN PATENT DOCUMENTS 2518615 11/1976 Fed. Rep. of Germany .
2925751 1/1980 Fed. Rep. of Germany .
57-25771 2/1982 Japan .
1536000 12/1978 United Kingdom .

Primary Examiner—Edward L. Coles, Sr.
Attorney, Agent, or Firm—Fitzpatrick, Cella, Harper & Scinto

[57] ABSTRACT

A copying machine including a photoelectric converter to photoelectrically convert an original image, a reference density signal generator to generate reference density signals, an A/D converter to A/D convert the signal produced by the photoelectric converter based on the reference signals from the reference density signal generator, a regional value allotment circuit which generates regional value signals for two values sequentially in synchronism with a picture element read by the photoelectric converter, a selector to select the regional value or regional value allotment, and an output device to output a reproduced signal from the selected regional value allotment signal coming from the regional value allotment circuit and the converted signal coming from the A/D converter in order to obtain a copy having desired intermediate tone.

51 Claims, 12 Drawing Sheets

| FIG. 4A | FIG. 4B |

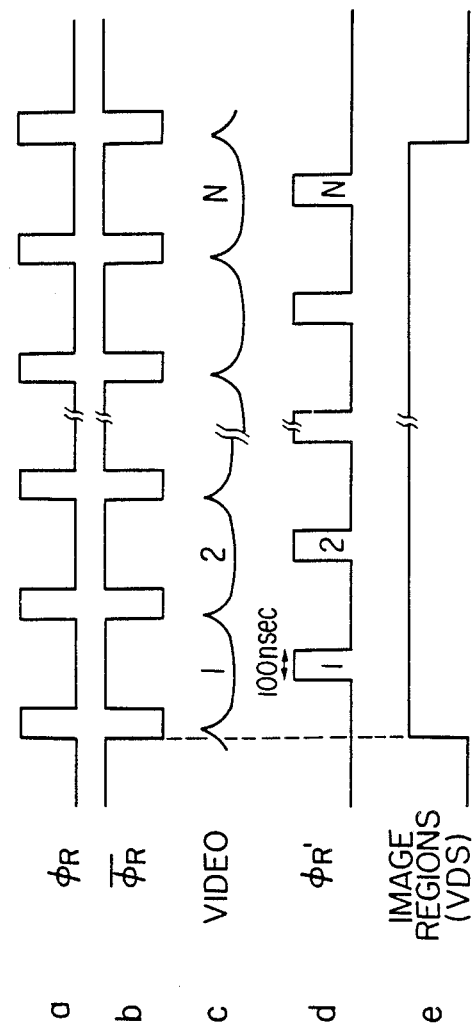
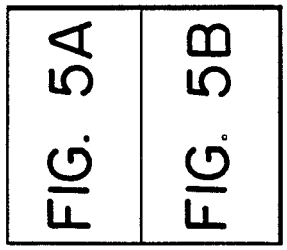
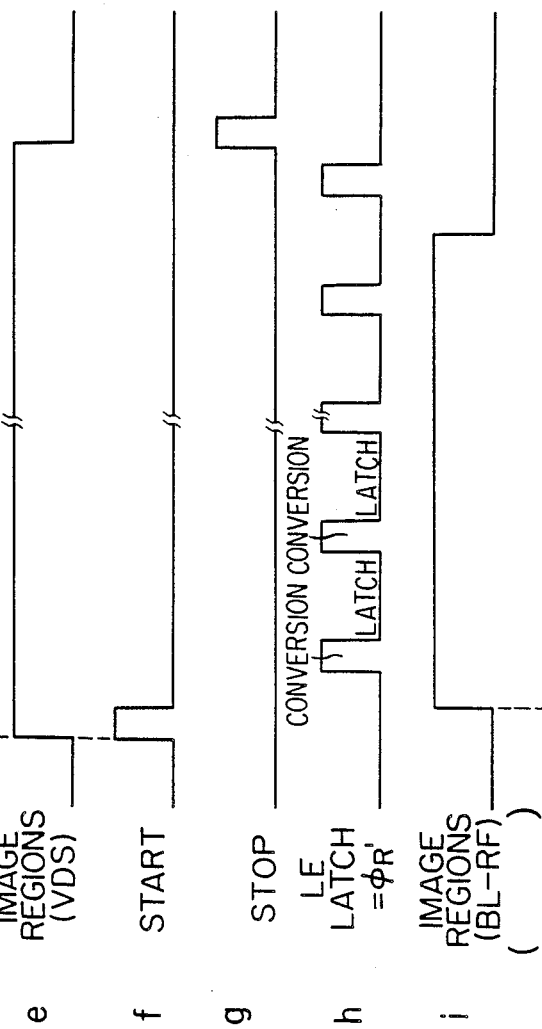
FIG. 5A

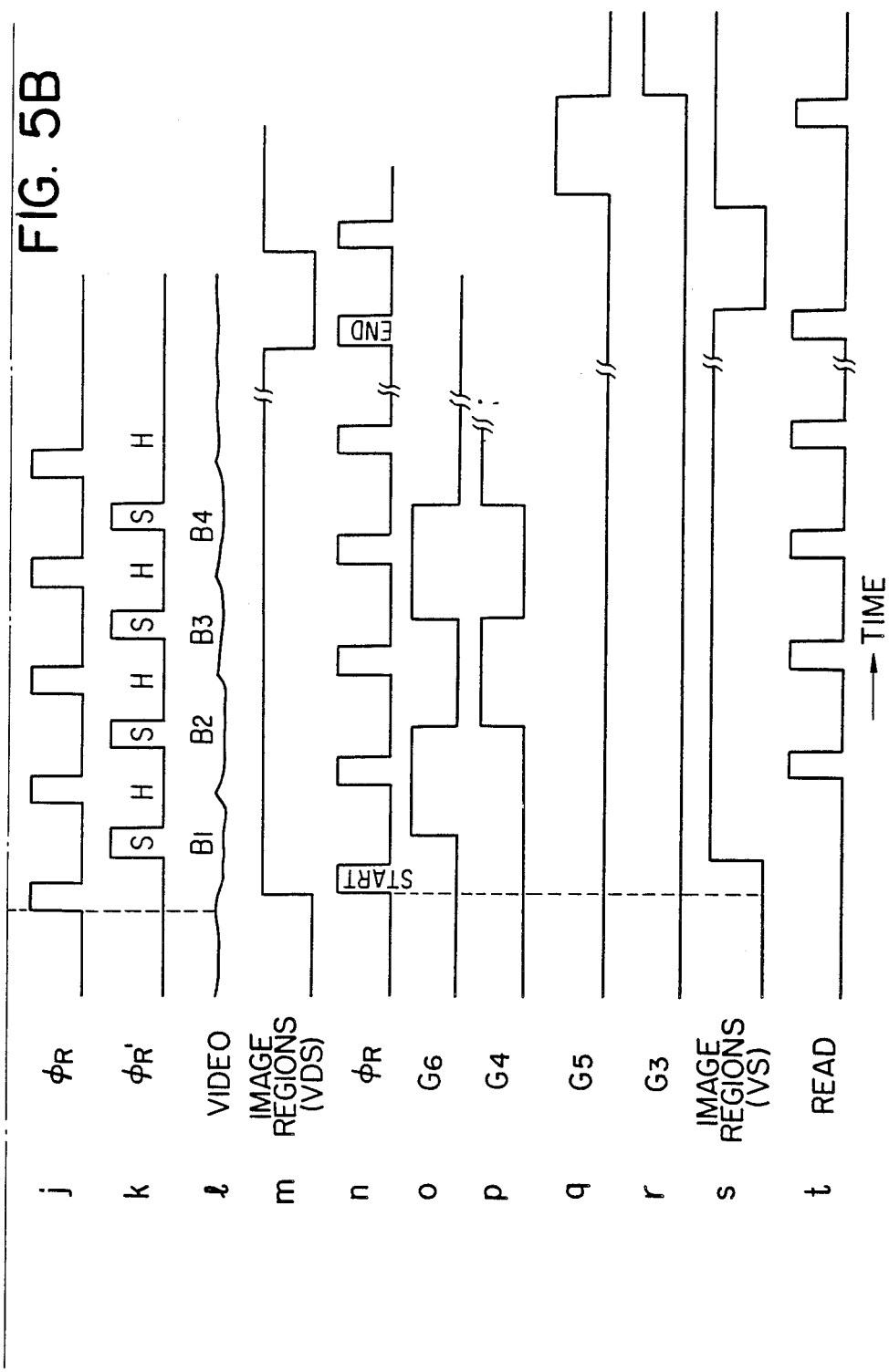

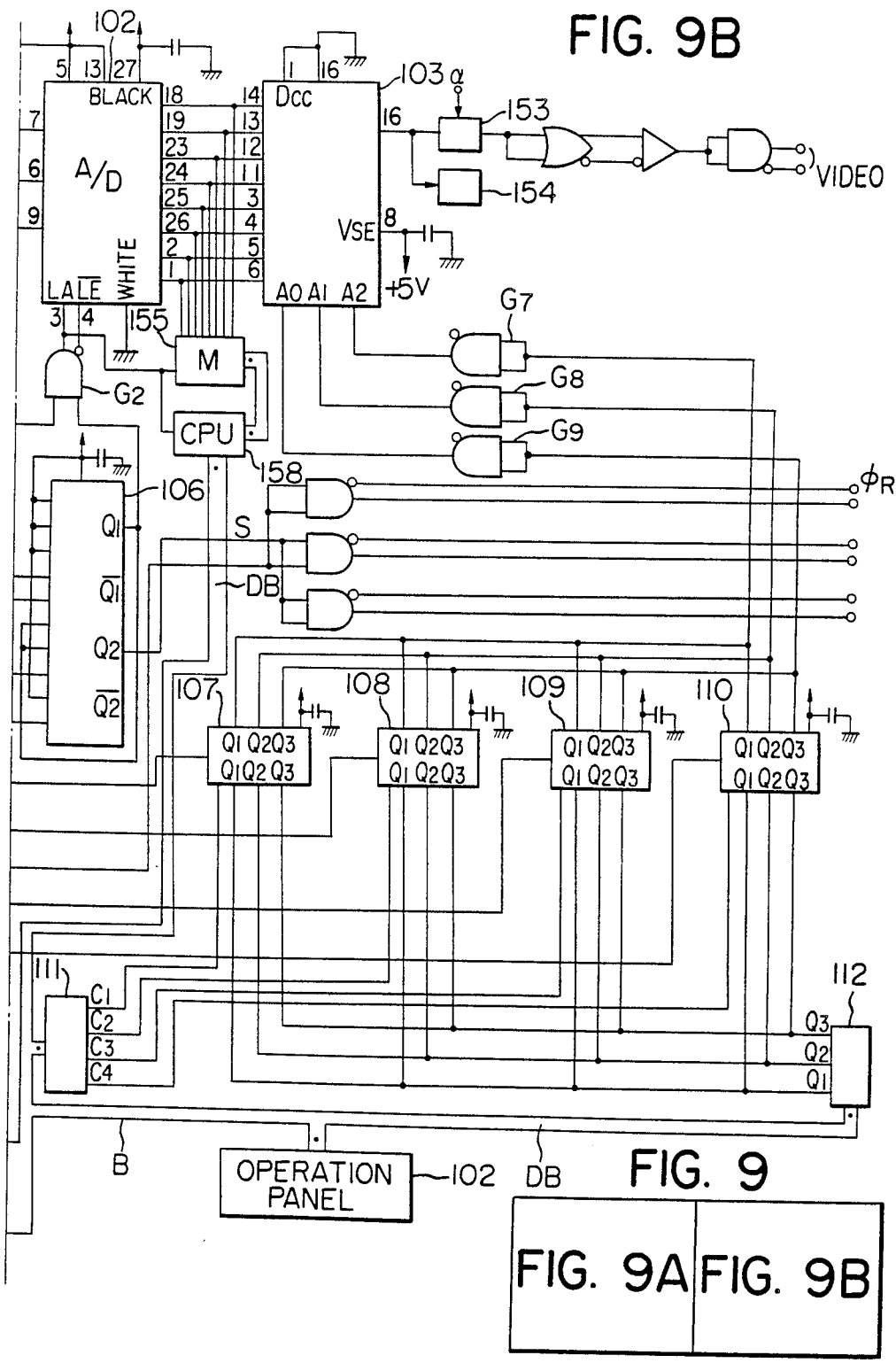

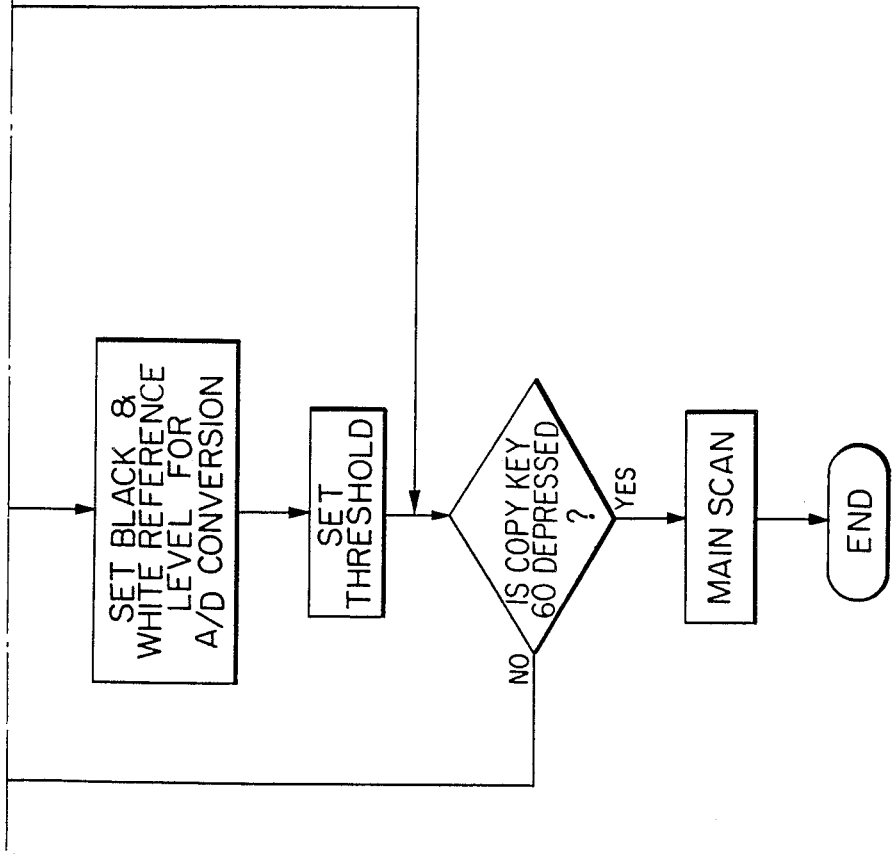
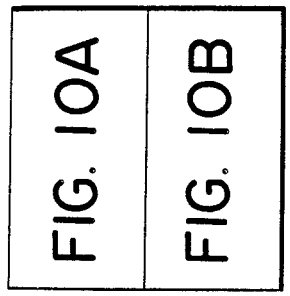

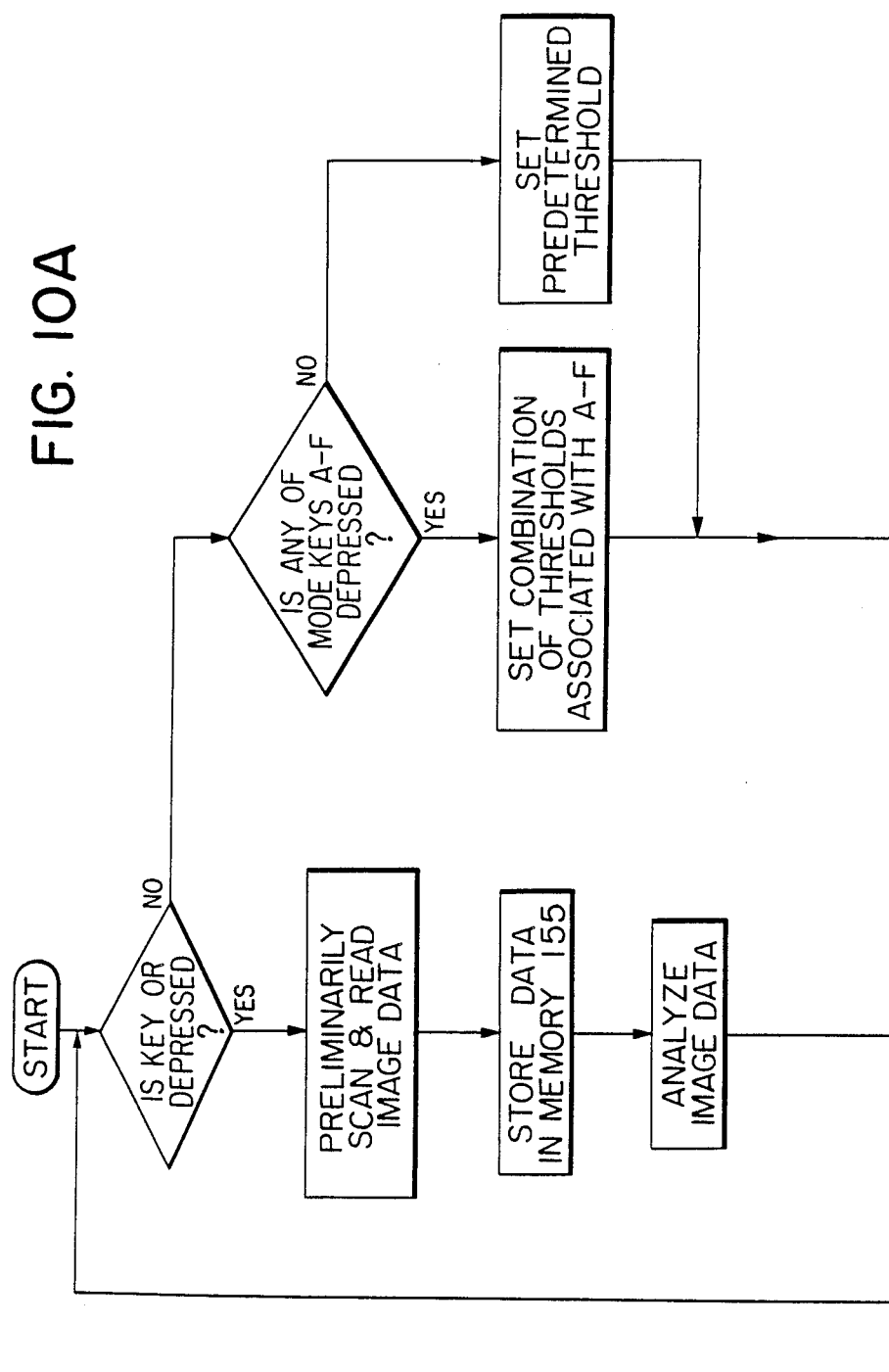

IMAGE REPRODUCING EQUIPMENT

This application is a continuation of application Ser. No. 937,505 filed 12/03/86, which in turn is a continuation of application Ser. No. 219,976, filed 12/24/80, now abandoned.

BACKGROUND OF THE INVENTION

1. Field of the Invention

This invention relates to image reproducing equipment used in a copying machine, etc., in which an original document image is read out by the use of a solid-state imaging device (CCD etc.) or other opto-electric conversion means to obtain an electrical image signal, and then the image is reproduced.

2. Description of the Prior Art

A device in which the original image is read out by a solid-state device such as CCD, used to modulate a laser beam to form a reproduced image on a photosensitive body is known. In this case the processing such as modulation is made easier by converting a read out signal into a binary digital signal. Accordingly the number of brightness levels were limited to two and the reproduction of intermediate tones was a difficult task.

There was an attempt to reproduce the image by using a large number of bits per picture element (pel) in order to express the intermediate portion of the analog level read out signal. However, it was unsuitable for a copying machine since the processing speed was reduced extremely and since the structure became complicated. It was impossible in the examples of the prior art described above to obtain a copy good gradation qualities from an original which is poor in gradation or a copy by increasing the contrast of a desired portion of the original.

SUMMARY OF THE INVENTION

An object of this invention is to offer specific image reproducing equipment capable of reproducing an intermediate tone of an original.

Another object of this invention is to offer image reproducing equipment capable of reproducing an intermediate tone of an original document without reducing the processing speed.

Still another object of this invention is to offer a copying machine used to obtain a clean copy from an original poor in gradation.

Still another object of this invention is to offer a copying machine capable of making a reproduced image from an original having a desired gradation.

The equipment according to this invention reads an original image by CCD, BBD, etc., performs analog-to-digital (A/D) conversion of a read out signal, and outputs reproducing signals corresponding to both the converted signal and threshold value allotment signal. The A/D conversion converts the read out signal into predetermined bits between the two levels, the reference black level and reference white level.

The threshold value is allotted timewise in synchronism with the original reading operation (electric charge transferring operation) and the synchronized allotment is made repeatedly. The threshold value and its allotment are set at desired values by the mode key on the control section of the copying machine. They are also set automatically based on the original state.

Therefore, this invention makes it possible to obtain a clear image when reproducing a blue-ground original by converting the blue-ground portion into white ground by changing the threshold value.

Further, this invention makes it possible to convert a portion or all of a white-ground original into gray.

Still further, this invention makes it possible to obtain a clear image in the case of handling an intermediate tone original such as a photograph by setting the threshold value properly when the contrast is too strong or too weak since the gradation is corrected properly.

Still further, this invention makes it possible to reproduced from the same original images having locally different gradations.

Still further, this invention makes it possible to have a computer perform optimum control in order to reproduce optimum gradation and obtain a clear image by pre-scanning the original to set the threshold value allotment automatically, by monitoring on the CRT when required, storing in the memory and having the computer discriminate the density distribution and the concentration degree of an intermediate level of the original data obtained therefrom.

Still further, this invention offers specific equipment capable of obtaining a copied image expressing the light and shade areas by handling a plural number of picture elements as one unit in the dither method and by letting the picture element correspond to one element of the dither matrix.

Sometimes in cases where the original is a mesh point picture, undesired interference fringes called "moire" appear in a reproduced image, but this invention offers picture processing equipment capable of reproducing an intermediate tone from either of a mesh point original and an original having no mesh points.

Other objects and advantages of this invention will further become apparent thereafter in the embodiments.

BRIEF DESCRIPTION OF THE DRAWINGS

FIGS. 5A and 5B, when combined as shown in FIG. 5, are operation time charts for FIG. 4;

FIGS. 9A and 9B, when combined as shown in FIG. 9, are schematic circuit diagrams of another processing control circuit;

FIGS. 10A and 10B, when combined as shown in FIG. 10, are control flow charts of the computer shown in FIG. 9.

DESCRIPTION OF THE PREFERRED EMBODIMENTS

Now the embodiments of this invention will be described in detail.

Figure 1A:
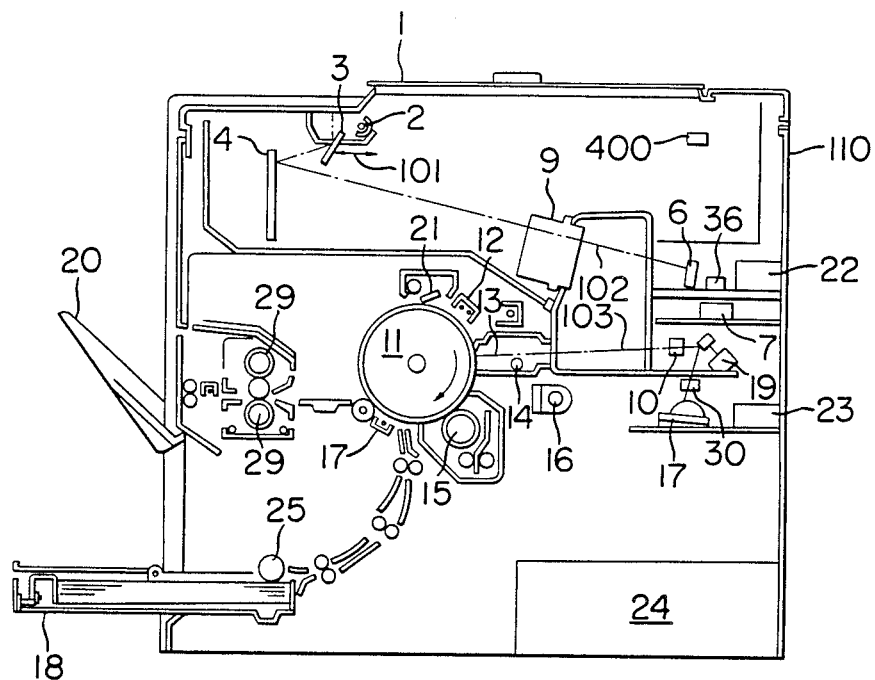
FIGS. 1A and 1B show a cross sectional view of the copying machine to which this invention is applicable and a plane view of the operation section, respectively.
Figure 1B:
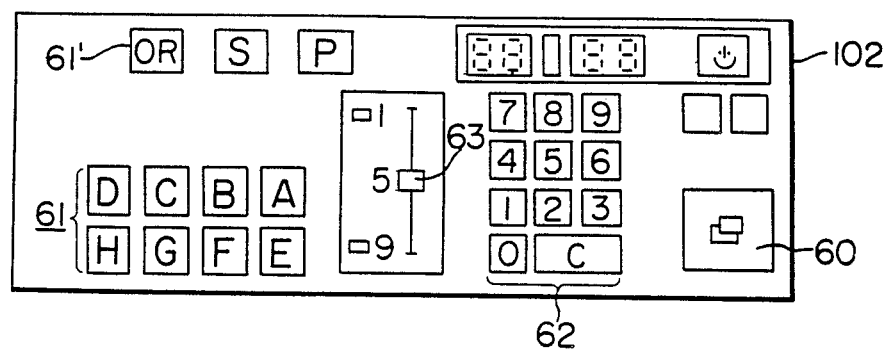

FIG. 1A shows the approximate cross sectional view of an example of an invented copying machine and FIG. 1B shows the plane view of the control section thereof. In FIG. 1A, reference numeral 1 designates the platen on which an original document is placed, 2 the lamp which is used to illuminate the original and which shifts in the direction of the arrow |o| together with the mirrors 5 and 4 in order to give slit exposure to the original. Numeral 5 denotes the lens system which converges the reflected light of the original made by the mirror on the image sensor 6 consisting of CCDs (charge coupled device), 7 the control section to read and process the image signal of the sensor 6, 8 the laser source, 23 the oscillation driver, 9 the polygon mirror used to deflect the beam from the laser source for scanning, 10 the f−θ lens which performs peripheral correction of the deflected beam, 11 the photosensitive drum, 12 the corona charger which charges the drum surface positively, 13 the corona charge which discharges the drum surface corresponding to an image pattern, 14 the lamp used to discharge the drum surface when no image exposure is made, 15 the developing device which develops the electrostatic latent image, 16 the lamp used to illuminate the drum uniformly in order to form as static latent image, 17 the corona charger used to transfer the developed image to a copying sheet of paper coming from the cassette 18, 19 the roller used to fix the transferred image, 20 the tray to discharge and accommodate the fixed sheet, and 21 the cleaning plate used to clean the drum surface after transfer. Numeral 22 designates the first central control section CPU which controls the oscillation section 23 of the reading section, and 24 the second central control section which controls the copy processing means such as the drum motor, chargers, and lamps.

The sensor 6 consists of a self-scanning type of image sensor whose light accepting sections are arrayed in the direction of a slit. Its resolving power in the reading of an original can be increased by installing two well-known CCDs in series. Numeral 36 designates the semiconductor memory RAM which stores image data, the first control section 22 is a control section which controls the address scanning of the image memory 36 and which contains CPU, etc. whose duty is to control the input to and readout from the memory 36. Numeral 30 denotes the modulator which modulates the laser beam.

The operation of this equipment will now be described. The surface of the drum 11 consists of a photosensitive body consisting of three layers and using a CdS photoconductive body. It is rotatably supported on the shaft and starts rotation in the direction of the arrow by the copy command generated by turning ON the copy key 60.

The original on the original table glass is illuminated by illuminating lamp 2 which is unified with the first scanning mirror and the reflected light is scanned by the first scanning mirror 3 and second scanning mirror 4. The first scanning mirror 3 and second scanning mirror 4 move at the speed ratio of 1:½. This allows the length of the light paths before the lens 5 to be kept constant while the original is being scanned.

The above-mentioned reflected light image is passed through the lens 5 and then converged to an image on the light accepting section of the image sensor 6 (Light path 102). The image is changed into an electric signal for every slit line by the self scanning function of the CCD, and stored in four buffer memories. Then from this buffer memory the data for one slit line are input to the image memory 36 as serial data and stored in the memory 36 starting with the initial address. By the copy start command the data from the memory 36 are output to the laser source 17 by way of the buffer. The oscillating operation, deflection, and modulation of the laser beam of the laser oscillator 17 are started by the data stored in the buffer.

The laser beam is swept in a horizontal direction by the constant speed rotation of the polygon mirror 16 and made to irradiate the photosensitive surface of the drum in the horizontal direction by way of the f−θ lens 15. The drum which rotates at a constant speed performs the scanning in the vertical direction.

The horizontal sweep and vertical scanning are made at the speeds at which the size of the electrostatic latent image formed on the drum matches the size of the origin on the platen.

Simultaneously with the laser irradiation to the drum surface, discharging of AC or of a polarity opposite to the primary charging, for example negative, is made by the discharger 13, then a high-contrast electrostatic latent image is formed on the photosensitive drum 11 by overall exposure made by overall exposure lamp 16. The electrostatic latent image on the photosensitive drum 11 is then visualized by the developing device 15 as a toner image. The sheet in the cassette 18 is sent to the inside of the machine by paper feed roller 25 and then sent to the image transfer section in such a way that the tip of the sheet is timed to meet the tip of the latent image by the resist roller 26.

The toner image of the drum is transferred to the sheet, fixed, and the sheet is discharged by an image transfer charger to complete copying on a sheet. On this one sheet all the picture element or pel data concerned with the original stored in the memory 36 are reproduced. It is also possible to process the picture element data read out by CCD6 by way of the control circuit (FIG. 4) described later and to output to the beam light modulater 30 directly.

Moreover, it is also possible to output the picture element data from the above-mentioned control circuit to 30 by way of the buffer memory corresponding to the laser beam scanning speed. In these cases, the start command is issued from the copy key 60.

In FIG. 1B, numeral 60 denotes the copy key, 62 the ten-key pad used to set the number of repeated copies from the same original, 63 the lever used to adjust the density of the entire reproduced image, 61 the key used to preset the intermediate mode, in which the key A puts importance in the reproduction of white to gray intermediate tone, the key B in the reproduction of an intermediate tone of only a gray section, the key C in the reproduction of a gray to black intermediate tone, and the key D is for standard reproduction. OR denotes the mode key used to preset the intermediate mode automatically in order to reproduce the optimum gradation by dummy scanning the original.

When the above-mentioned mode key is turned on, the machine sets the predetermined data on the latch circuit described later and then stands by. Thereafter the copy key 60 is turned on to start the scanning and printing operation. During the printing operation, inputs from mode key and ten key are forbidden in order to prevent erroneous operation.

The control of intermediate tone will be described in detail below.

In this example the light and shade levels of the picture element in an original picture are compared with the threshold value for the picture element to obtain binary signals. In this case one region is formed by collecting several adjacent picture elements (for example 2×2). In this region threshold values are different for individual picture elements. Accordingly if there are N picture elements in this region, N threshold values are present. For this reason, it is possible to input one picture element with one bit and to output at the rate of one bit per picture element. As a result, if there are N light and shade levels, one picture element does not need N bits and the number of bits can be compressed to 1/N. However, the picture quality is dependent on the methods of selecting and arranging these threshold values.

In this example a 2×2 dither matrix is made to correspond to the set of picture elements of one region, compared, and output one picture element after another.

Figure 6:
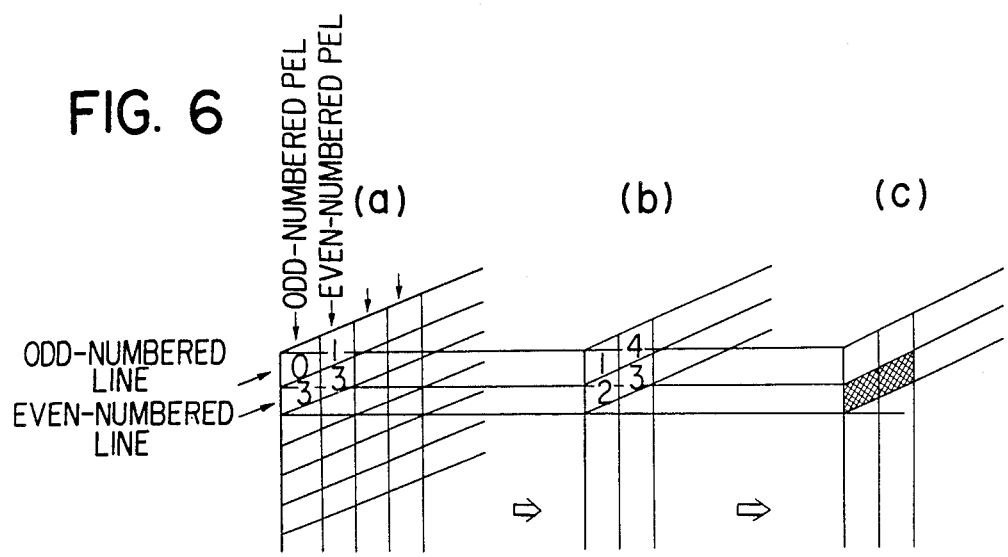
FIGS. 6, 7, and 8 are explanatory views of the operation for FIG. 4.

In FIG. 6, (a) shows the group of picture elements in one region of the original, (b) the 2×2 dither matrix, and (c) the pattern of reproduced picture image. The larger the numerals of (a) and (b) the denser the light and shade level. First, the level 0 of the input picture element is compared with No. 1 of the dither matrix and since the former is below the latter, 0 is output as a reproducing signal for white.

Next, the level 1 of the picture element in the scan direction is compared with No. 4 of dither and 0 is output for white. In this way, the scanning is advanced to the right side in the drawing, and shifted to the next line when the scanning of one line ends. The picture element and matrix are compared in a similar way and since each of the picture elements 3, 3 is greater than 2, 3 of the matrix element, a 1 is output to reproduce black. The reproduction of an intermediate tone is made in this way.

Moreover, in this example, the range of the level of read picture elements is divided into more than the number of matrix elements so that the fine reproduction of gradation can be made within desired light and shade ranges such as in the neighborhood of white, gray, in the neighborhood of black, etc.

Further, in this example, it is possible, in the case where the density levels of picture elements are classified 1 through 8, to make the levels of matrix elements be 1, 3, 5, 7 without changing the order of the levels such as 1, 2, 3, 4 mentioned above. It is also possible to obtain a fine gradation of intermediate tone by making the matrix element levels be 3, 4, 5, 6, reproducing the density levels of picture elements 1 through 3 and 6 through 8 with single levels, and dividing only the intermediate levels 3 through 6 by the threshold valves mentioned above to control the output.

It is possible to change only the allotment of element levels in the scanning direction and, by monitoring with CRT, etc. the change in the reproduced image caused by the change in allotment, it is also possible to obtain the optimum allotment.

Figure 2:
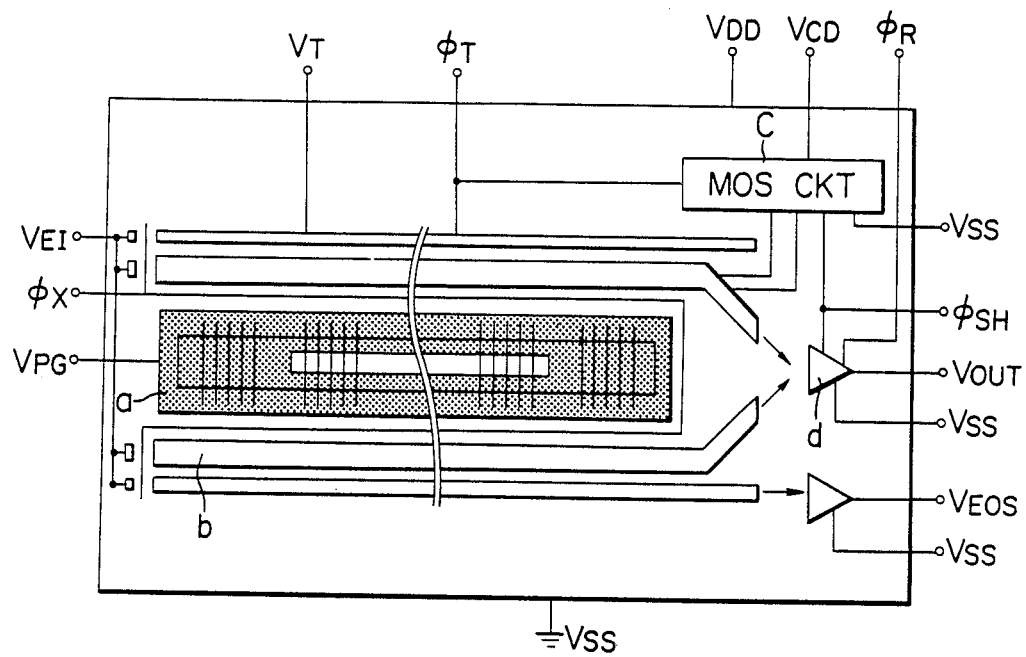
FIG. 2 is a schematic block diagram of the reading section shown in FIG. 1.

FIG. 2 shows the block diagram of the linear sensor of the picture imaging device (C$^4$D of Fairchild Semiconductor Corporation). The exposure section is designated by a which accumulates an electric charge which corresponds to the accepted light level when the sensor is exposed, b denotes the transfer section consisting of a shift register which is used to perform serial transfer of an electric charge, c denotes the generator section which generates clock pulses used for the transfer, and d designates the circuit which samples and holds the transferred data sequentially.

Figure 3:
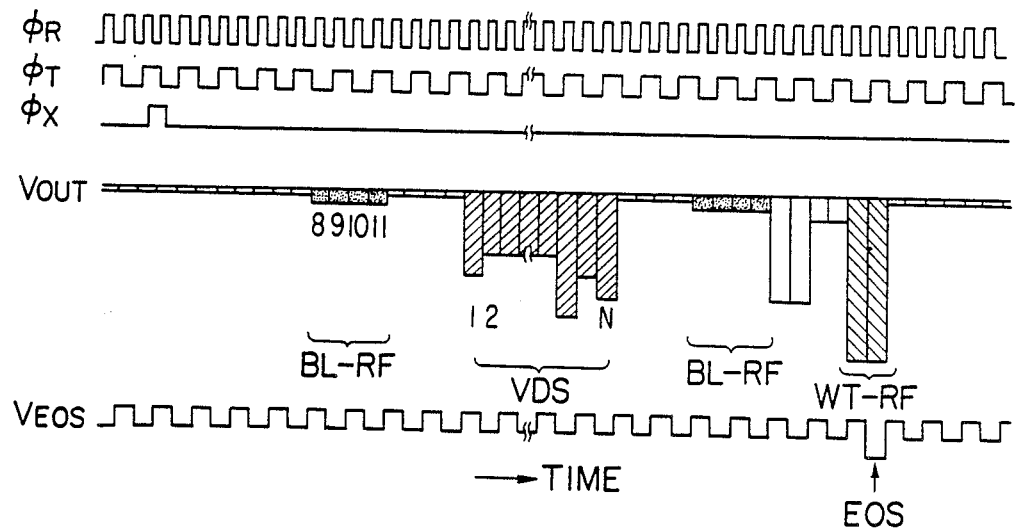
FIG. 3 is a time chart for FIG. 2.

The process of data transfer will be described referring to the CCD signal timing chart shown in FIG. 3. The photons, which have been accumulated in the exposure section a of FIG. 2 for a predetermined time, are transferred, from each cell of the exposure section a at the same time, to the shift register of FIG. 1B by the pulse $\phi X$ shown in FIG. 3. $\phi T$ of FIG. 3 is the transfer clock for the shift register b. The data that has been transferred are input sequentially to the hold circuit d of FIG. 2 and then output. $\phi R$ of FIG. 3 is the reset pulse for the hold circuit d. $V_{out}$ of FIG. 3 is the picture signal which contains, besides the real picture signal, reference black level signal BL-RF and reference white level signal WT-RF. Those reference signals are the pulses on the right side of the read out signal $V_{DS}$ of FIG. 3 and are output by CCD itself. The high level (FOS) of $V_{EOS}$ shown in FIG. 3 is the end of the scan signal which is output every time the scanning ends.

By the transfer scanning for one line, the hold circuit d outputs low level BL-RF signal, then, the read out signal $V_{DC}$, again the BL-RF, and finally the high level WT-RF of reference white signal as $V_{out}$. At the same time the $V_{EOS}$ port senses the high level and outputs end signal EOS for one line. The output $V_{OUT}$ is input to the Video input port shown in FIG. 4.

Figures 4, 4B:
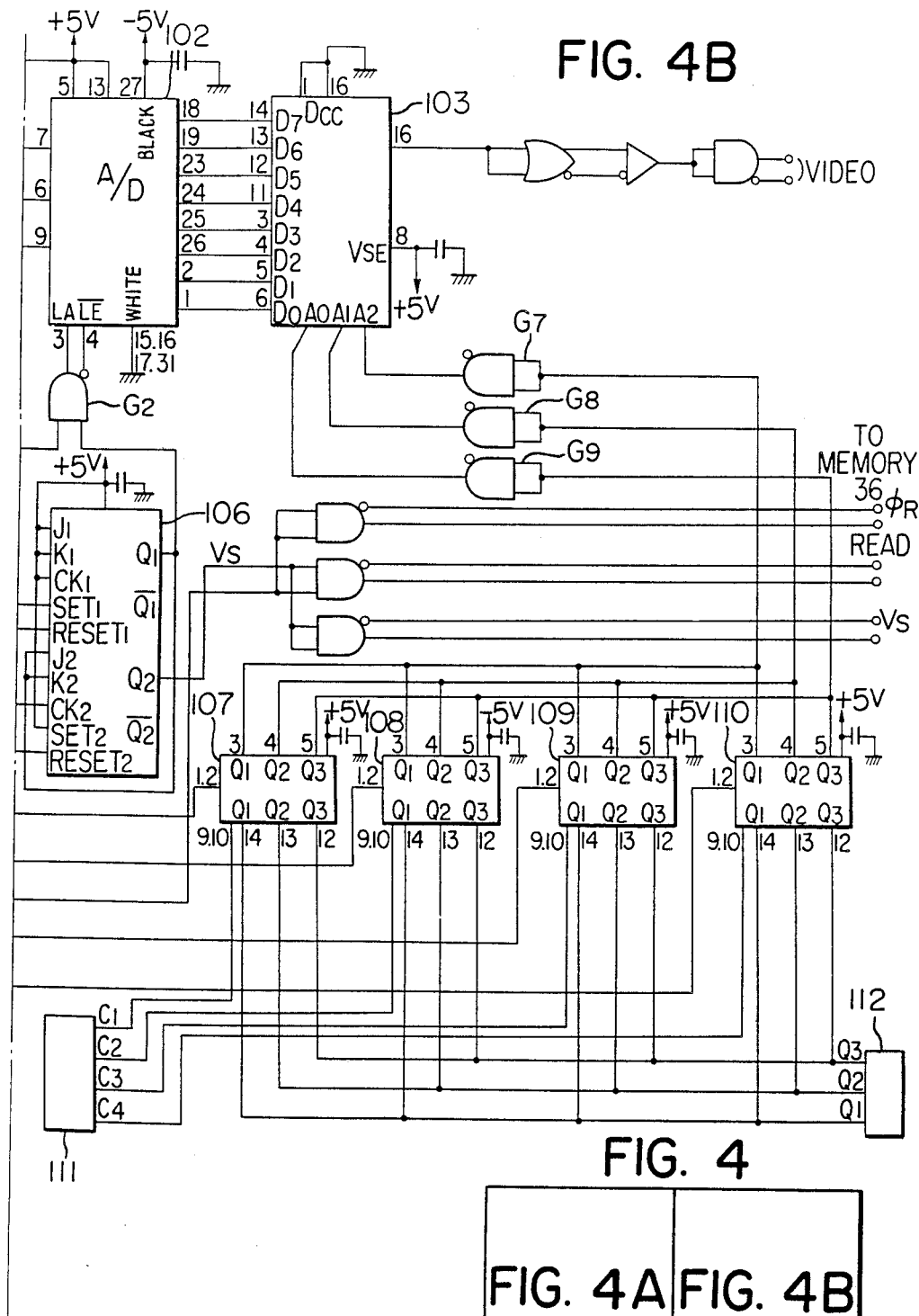
FIGS. 4A and 4B, when combined as shown in FIG. 4, are schematic circuit diagrams of the processing control contained in this invention.
Figure 4A:
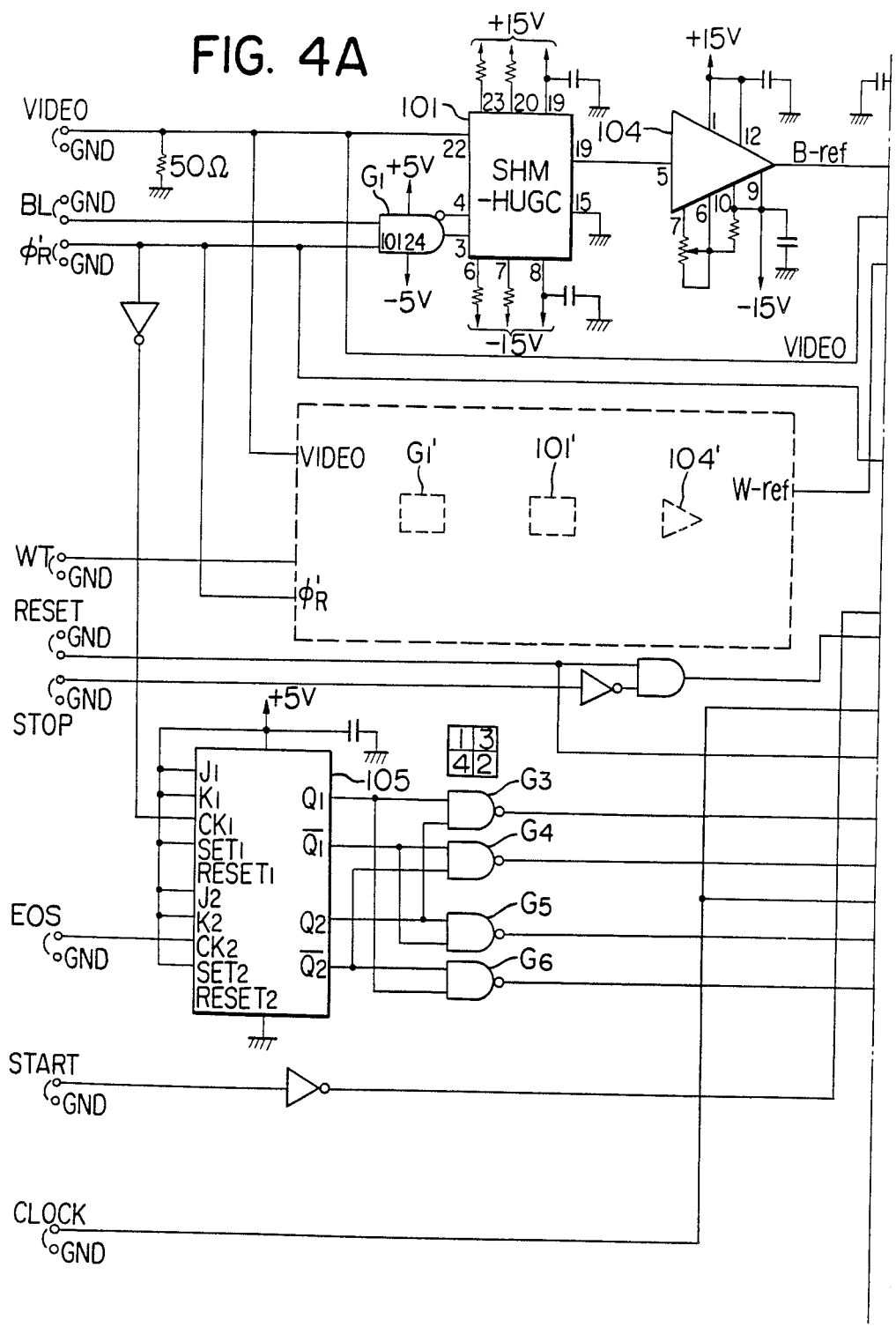

FIGS. 4A and 4B show an example of a data processing control circuit in this invention. Numerals 101 and 101' in the figure are respectively the sample and hold circuit which samples from the input data $V_{out}$ the reference black and white level signals BR-RF and WT-RF and holds them while reading the original, G$_1$ and G$_1$' are gate circuits which have each of sample circuits 101 and 101' perform sample operations by the AND condition between the signals BR and WT, which are 1 whilte BR-RF and WT-RF are present. The sample timing signal $\phi R'$, 102 is the analog-to-digital (A/D) converter which inputs picture signals (black and white 2 value reference level signals from the sample and hold circuit and the read out signal from CCD) and outputs 8 levels (8 bits) corresponding to the input level, 104 and 104' are amplifiers, G$_2$ is the gate circuit which allows the A/D converter 102 to operate conversion under the AND condition between the signal from the flip-flop 106 and the signal $\phi R'$, the flip-flop 106 is the conversion timing generator which operates repeatedly under the conditions of line scan start signal START, stop signal STOP, and transfer clock pulse $\phi R$, 103 is the data selector which has a threshold value and which inputs 8 bits from the A/D converter 102, makes decision on the selection and output corresponding to the threshold value to form a binary video signal, and G7 through G9 are the gate circuits which set the threshold value of data selector 103 by the 3-bit codes from the latch circuits 107 through 110. The latch circuits 107 through 110 latch the data of the dither matrix of FIG. 6 as the set of 3-bit codes and respective data correspond to matrix elements data 1, 4, 2, 3 or 1, 3, 4, 2, etc. (in the order of 107 to 110. Numerals 111 and 112 are the preset means to input data sequentially to the latch circuits 107 through 110, in which data is set by 112 in the order selected by 111, 111 and 112 perform the abovementioned input operation by the keys A through H shown in FIGS. 1 and 2 and select desired threshold values.

Figure 8:
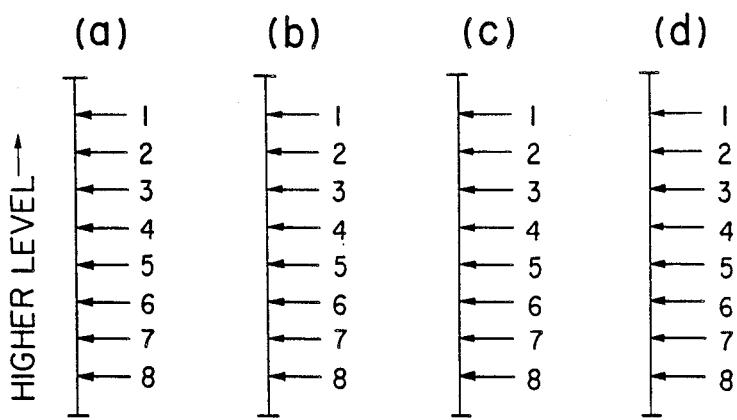

In order to select the number of threshold values surrounded by circle in (a) through (d) of FIG. 8 by turning on the keys A through D respectively, C$_1$ is first output by a key (for example, the key is assumed to be A and the dither matrix to be of the matrix allotment shown in FIG. 6) to bring the latch circuit 107 into its latch on state, generates data 1 from 111 as D$_1$, has 107 latch the data, next brings the latch circuit 108 into its latch on state by outputting C$_2$ from 111, generated data 4 from 112, has 108 latch the data, and thereafter proceeds similarly until 2 and 3 are latched by latch circuits 109 and 110. Since the circuits to meet this purpose can be ordinary matrix circuits, description of the circuits are omitted.

In this way, the desired threshold value is preset. In the case of FIG. 8 (a) the bright portion is divided into 4 levels and the output is selected. Accordingly the intermediate tone of a bright portion can be reproduced more in detail than the intermediate tone of a dark portion.

$G_3$ through $G_6$ are used to effect synchronization of the outputs of the latch circuits 107 through 110. $G_3$ through $G_6$ are the gates that select 107 through 110 so that they select the latch circuits 107 and 108 alternately corresponding to the even and odd turns of read out picture elements and select and output 109 and 110 alternately corresponding to the even and odd turns of the line repeatedly.

These gates are combined with the flip-flop 115 to form a quarternary counter. The flip-flop 105 consists of two flip-flops and these two flip-flops are reversely controlled repeatedly by the signal $\phi R'$, which corresponds to the picture elements, scanning in the line direction the signal "end of scan" EOS which corresponds to the change from a line to the next line. The states of latch circuit selection are shown in FIG. 5 o through r. By this, it is possible to have the threshold value correspond to the element of matrix pattern of the threshold value corresponding to the read (transfer) scanning.

$\phi R'$ is a clock half bit delayed from the transfer clock $\phi R$ like a and k shown in FIG. 5. START and STOP can be obtained at timings f and g shown in FIG. 5.

Operation will be described referring to the time chart shown in FIG. 5. The $V_{OUT}$ signal of FIG. 3 is input to VIDEO input port shown in FIG. 4. Before starting scanning the original dummy scanning is made for the first CCD line. The reference black level signal BL-RF and reference white level signal WT-RF from port Video which are output during this dummy scanning are held by S/H circuits 101 and 101' respectively.

The black signal BL-RF is sampled and held by the timing signals BR and $\phi R'$ and similarly the white signal WT-RF is sampled and held by the timing signals WT and $\phi R'$ as shown by i, j, k, and l in FIG. 5.

The above-mentioned reference output of each S/H circuit is input to the reference voltage ports ⑦ and ⑨ and the A/D converter 102 by way of the amplifiers 104 and 104'.

When the scanning of the original is started, its read data are input to ⑥ of the A/D converter. Since, during this scanning, the reference black and reference white levels are input to and held by ⑦ and ⑨, the A/D converter 102 performs A/D conversion to convert the input data to ⑥ into 8 bit levels between these black and white levels.

Figure 7:
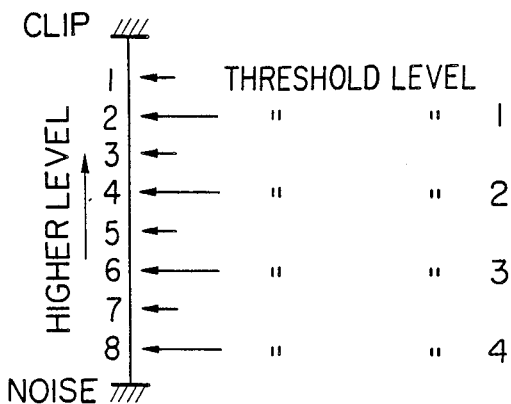

The converted levels are shown in FIG. 7 as levels 1 through 8. This means that the intermediate tone of the picture element is divided into nine kinds of levels. However, since enable signal LE is given to ③ and ④ of the A/D converter 102 within the picture area as shown in h of FIG. 5 the video signal to be input to ⑥ is A/D converted as described above for that period. Although the timing of this enable signal is obtained from the flip-flop 106 and $\phi R'$, the flip-flop operates on STAT signal (FIG. 5f), STOP signal (FIG. 5g), and $\phi R$ signal (FIG. 5a) and produces the waveform shown in FIG. 5e.

The A/D converter 102 has eight comparators not shown in the drawing, and is reference input is given by internal resistance network between ⑦ and ⑨. The converter outputs the comparator output untouched. For example, this is possible with Type ADC-HU3BGC. Next, the 8-bit parallel outputs of the A/D converter 102 are input to each input port of the data selector 103, and its data are selectively controlled in the output by the threshold value determined by the 3-bit control signal input to the ports $A_0$ through $A_2$. In this case it is possible to change the threshold value for the above-mentioned selective control by varying the contents of the 3-bit code for $A_0$ through $A_3$. Moreover, since in this example the dither matrix shown in FIG. 6 is used, the selection of the threshold value is selectively controlled corresponding to whether the specified picture element along the line is an even turn or odd turn, or whether the line is an even turn or odd turn, in order to allot the threshold values periodically.

As a result the data selector 103 gives the picture element data level weight by threshold value control and as timewise serial 2 value signal outputs them to the laser beam modulator or the memory. This enables the copying to be made with desired gradation or optimum gradation.

The threshold value selective control operation will be described below. Four outputs from the flip-flop 105 which is reversed by the $\phi R'$ signal which corresponds to the picture element and the EOS signal which corresponds to the line are decoded by the gates $G_3$ through $G_6$. These gates form a quarternary counter and output signals o through r shown in FIG. 6. These signals are input to the terminals 1 and 2 of the latch circuit as the select signal of the latch circuits 107 through 110.

Accordingly the latch circuits 107 through 110 are selected alternately corresponding to whether the number of the picture element on one line is even or odd or whether the number of lines is even or odd, and output 3-bit data which corresponds to one of the matrix elements in synchronism with the picture element timing.

The 3-bit data are input to the terminals $A_0$ through $A_2$ of the data selector 103 by way of the gates $G_7$ through $G_9$, to set the threshold value. In synchronism with the selective operation of the latch circuit the threshold value is changed over sequentially. This means that the latch circuit is selectively scanned in synchronism with the read scan of the picture element, and the threshold values are allotment scanned by it, to obtain a desired intermediate tone output from the data selector 103.

Signals READ and VS shown in FIGS. 4 and 5 are the control signals used to store the processed data VID in the image memory 36. These are output after being delay synchronized for the length of delay in processing time.

The control circuit that performs data setting by the signals to ⑭, ⑬, ⑫ and ⑨, ⑩ of the latch circuit is enabled, by performing pre-scanning of the original before the picture image scanning for print is started, to process the signals obtained from the scanning to output the set signal and latch automatically the threshold value control data which is most suited to the original in the latch circuit 7 through 9.

It is aso possible to use as the reference BL-RF and WT-RF signals to be input to the S/H circuit, not the signals inherent to CCD, but the signals generated by reading the black and white marks installed at special positions of the original table glass.

It is also possible to prescan the original, reading and deciding the black tone peak and white tone peak of the original and to make them preset and held by the S/H circuit as BL-RF and WT-RF.

Moreover, although the original picture signal can express with white and black binary signals the lights and shades by allotting for example 4 threshold values, in the case of an original copied with the diazo method or an original having colored ground it is sometimes preferrable to erase the ground color and to reproduce. Although the control circuit is not shown in the figure, it is easily possible to set the dither threshold value allotment for erasing the density of the ground by preparing programs for the diazo original, colored original, etc.

If it is subsequently desired to reproduce a portion of the original without providing light and shade portions, it is sufficient to vary the threshold value only at the time of reading the desired portion. In this way it is possible to give a copy light and shade portions. Accordingly it is possible to make the important point of the document remarkable. The above-mentioned controls can be performed easily by preparing a general purpose program and by inputting data (designation of a place desired to be given with light and shade, and setting of regional value) by keyboard switches, using the keys.

It is also easy by reading in the picture signal to the control circuit at the time of first dummy scanning, calculating out the optimum dither threshold value and setting it automatically.

It is also possible not to send the picture signal to the reproducing device, but to accumulate the signal in a CRT monitor and to have the operator decide on an optimum dither matrix while he is setting the threshold value allotment manually, watching the monitor.

Although a 2 x 2 dither matrix was set in this example high quality picture processing can be made by not only controlling the threshold value but also performing size control of the dither matrix together.

Figure 9A:
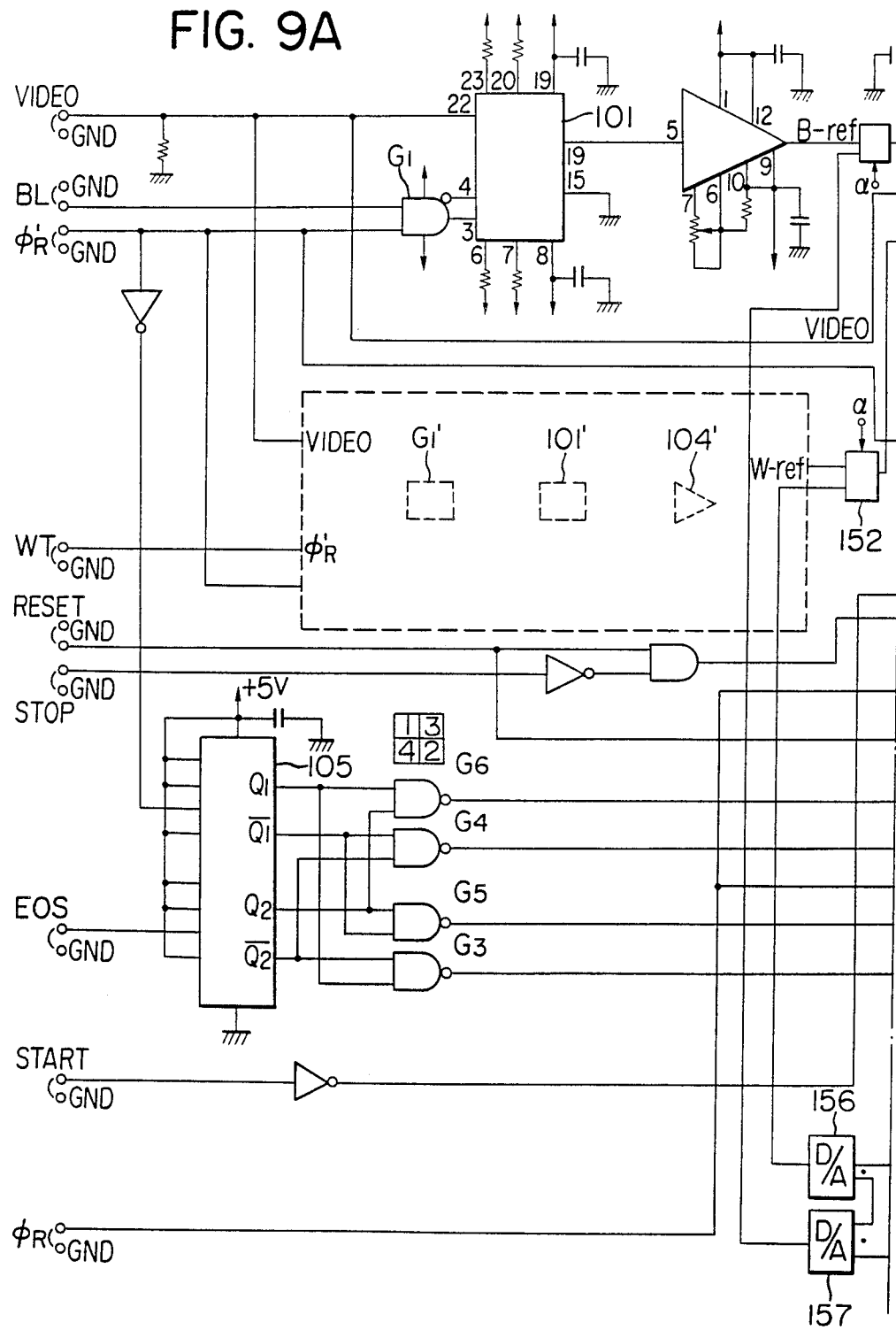
Figure 11:
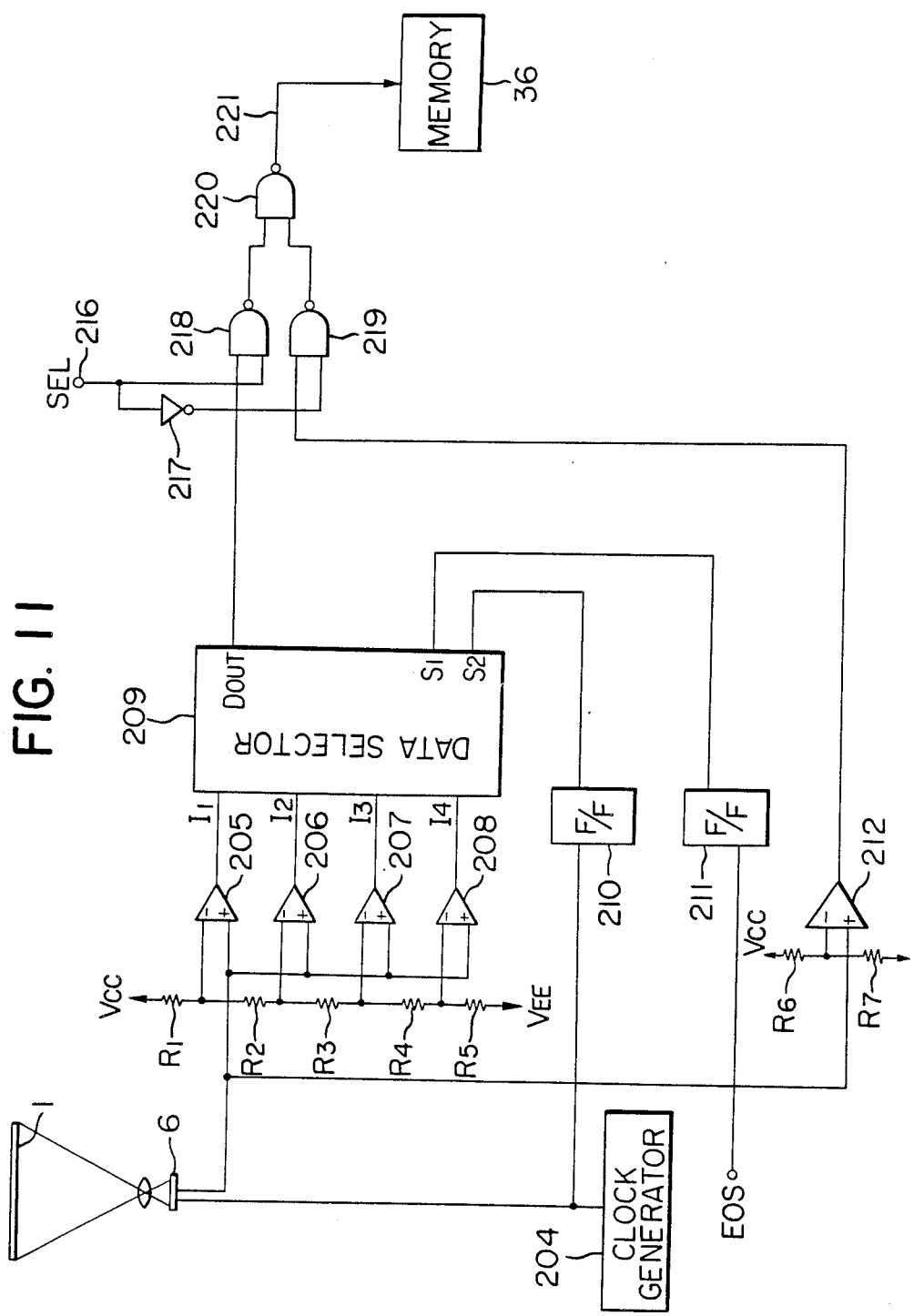
FIG. 11 is a schematic circuit diagram for another control circuit.

FIG. 9 shows another example of a control circuit. It was made by adding the function of automatically setting the regional value and its allotment or the reference value of A/D conversion and more detailed circuit example to FIG. 3.

Numerals 151 and 152 are the analog switches used to set black and white reference signals on the A/D converter 102, where output is changed over by the control signal 2. Numeral 153 is the analog switch used to turn on and off the output of video signal VID, 154 is the CRT which monitors the video signal VID, 155 is the memory which stores all or one portion of the original image, 156 and 157 are the D/A converters which give reference signals based on the original state to the input of one of the above-mentioned analog switches 111 and 112, 158 is the central processing section which includes a microcomputer and which performs the processing of image data of memory 155, processing of key input from the operating section 102, and controls each analog switch, and control of D/A converter.

In the program memory ROM stored is the program shown in the flow chart of FIG. 10. DB is the data bus which is the line for the data going to or coming from the above computer.

When the key OR (61') on the operation panel 102 is turned ON, CPU reads it and (step 1) first sets analog switches 151 and 152 to B-ref and W-ref sides and the abovementioned signal from CCD is set on the A/D converter. And then the lens system is put into reciprocating movement and made to provide a preliminary scan of the original. By this the video signals VIDEO incoming sequentially are A/D converted based on the reference signal (step 2). Since at this time the analog switch 153 is open the digital processed video signal VID is not output to the external image memory.

The A/D converted 8-bit signal becomes the input of the data selector 103 and at the same time is input to the memory 155 (step 3). This memory is connected to the CPU 158 and by the A/D conversion control signal and the output of the gate $G_2$ read white controlled. Accordingly the CPU synchronizes with the output of the gate $G_2$ during preliminary scanning and controls storing 8-bit data in memory 155 at for example h pulse intervals or every two pulses. Besides the memory 155 having a control signal ($\alpha$, etc.) line and data bus line, the key group of panel 102, D/A converters 156 and 157, threshold value latch controller 111 and regional value data setter 112 are connected to this CPU.

The data stored in memory 155 undergoes predetermined processing by CPU 158. This processing is performed by the program of program memory ROM in the computer of CPU. One example is to retrieve among the video signals in memory 155 the levels of black peak and white peak (step 4). The detected peak values are respectively converted into analog signals by the D/A converters 156 and 157. The CPU sets the analog switches 151 and 152 to D/A converter side (step 5). In this way the white and black peaks of the original obtained by preliminary scanning become the reference pulses of the A/D converter 102. Accordingly at the time of main scanning of the original A/D conversion can be performed based on this. Accordingly reproduction of an intermediate tone can be made within the range (scale) of the light and shade tones of the actual original. Moreover, the accuracy is increased by causing the peak levels to be generated at the same rate as the reference levels of A/D converter by D/A converting them.

Another example of control is to put black and white marks on the platen in advance so that the CPU reads them by the above-mentioned preliminary scanning and to A/D convert and store in memory 155 similar to the above. Since the positions of these marks (which corresponds for example to 1000th clock based on the pulse $\phi R$) are known in advance, CPU senses (counts) the output of gate $G_2$ to discriminate the levels of the black and white mark data. These data are converted by D/A converters 156 and 157 and become the reference values of A/D converter 102. As still another example, the CPU computes the mean density of the memory data of the image of the original obtained by preliminary scan. Also the intermediate level of the white and black levels coming from DDC are obtained and output to D/A converter so that to perform such correction as to shift the white and black reference levels of A/D converter by taking the difference between the mean density of the original and the intermediate level. Accordingly reproduction of light and shade is made having reference to the neighborhood of the center density of the original.

The CPU also sets the above-mentioned regional values and timewise allotment of the regional values (step 6). In other words, based on the data of memory 155 obtained by the above-mentioned preliminary scan, the CPU sets predetermined data to the regional value data setter 112 and given write signal for the latch circuits 107 through 110 to the latch control signal generator 111 to obtain the reproduction of most optimum intermediate tone. This regional value setting is also made in the three preceding examples. When the copy key 60 is turned on, the main scanning of the original is made (steps 7, 8). At this time the data selector 103 is controlled by the white and the black reference levels and regional value allotment is determined as mentioned above. If an original is special, for example when the original is of a mesh point type, the same value is set to the latch circuits 107 through 110 so that the regional value of each element of the dither matrix is equal.

If the latter half of the original consists of characters, the latter half is simiarly set to the same value. This partial setting can be attained by using for example the key P of FIG. 2. The values of the above-mentioned data are determined depending on the density of the mesh point and characters.

When one of the mode keys A through F is actuated instead of the preliminary scan key OR (step 9), the CPU gives the regional value data which corresponds to each key to the setter 112 and latch controller 111 (step 10) to perform predetermined intermediate tone reproduction. In the case the key S is actuated, CPU sets the same value to each of the latch circuits 107 through 110 as mentioned above (step 11). This is effective to a mesh point original.

If the ten-key is turned on after the key P is turned on, CPU can designate the desired area of the original and performs the above-mentioned dither processing on the image data of the area. For this purpose, CPU sets the predetermined regional value allotment data of mode A to the latch circuits 107 through 110, taking timing with that area. By making the number of ten key correspond to the number of pulses of the above-mentioned gate $G_2$, that area can be decided by the pulse count. The regional value set to each latch circuit at the time of key S is adjusted in Step 11 by raising or lowering the density lever 63. This enables the density of the copy to be adjusted manually.

FIG. 1 shows an example of another control circuit for this embodiment. The reflected light from the original is applied to the one dimension solid-state imaging device 6 (linear sensor array) through the image forming lens to form an image and sampled and read out sequentially by the clock $\phi R$ from the clcok generator 204. The read out picture signal is input to the comparators 205 through 208 and 212. These comparators have the function of A/D conversion.

The comparison reference levels of the comparators 205 through 208 are given by the resistance networks of $R_1$ through $R_5$ and the output signals $I_1$ through $I_4$ of the comparators 205 through 208 are input to the data selector 209. The select signal input terminals $S_1$ and $S_2$ of the data selector 209 are connected to the outputs of the flip-flops 210 and 211 respectively. The flip-flop 210 forms a 1-bit counter which counts the clock of the clock generator. The flip-flop 211 forms a 1-bit counter which counts the signal EOS. The signal EOS is a signal which is output one time for each scanning line. The data selector 209 selects one point from the four inputs by the signals applied to $S_1$ and $S_2$, the outputs it to the terminal Dout.

The data selector 209 forms a two valued circuit of a systematic dither method which changes the threshold value of picture data by whether the picture elements and scanning line are of an even turn or odd turn.

The selected output of the data selector, connected to one of the inputs of the data selector, is connected to one of the inputs of the gate 218. The signal selection of data selector 209 by the signals $S_1$ and $S_2$ is shown in the table below.

TABLE

| $S_2$ | $S_1$ = 0 | $S_1$ = 1 |
|---|---|---|
| 0 | $I_1$ | $I_3$ |
| 1 | $I_4$ | $I_2$ |

Signal $S_1$ is the signal expressing whether the scanning line is even turns or odd turns and signal $S_2$ is the signal representing whether the picture element is even turns or odd turns. If here, for example, 0 is even turns and 1 is odd turns, the signals $I_1$ and $I_4$ are alternately selected in the even line of scanning line. In other words the threshold values are to be converted into two value signals and switched alternatively.

The same applies also to the even lines of scanning lines. On the other hand, the picture signal input to the comparator 212 is made by two values signals by predetermined threshold value regardless of the older of the scanning line or picture elements determined by the resistors R6 and R7 and its output is connected to one of the inputs of the gate 219.

The operator decides that whether the original to be read is an original containing intermediate tone by mesh points or not, and sends the SEL signal to the terminal 216. The signal SEL applied to the terminal 216 together with another input of the gate 218 is applied to the other input terminal of gate 219 by way of the inversion circuit 217. Accordingly, depending on the polarity of the signal applied to the terminal 216 one of the gates 218 and 219 is selected. The output of gate 218 or 219 is output to the terminal 221 by way of the gate 220. The terminal 221 is connected to the picture memory and the data or stored in the memory 36. Accordingly since in the case the original is of mesh points the regional value allotment control by $S_1$ and $S_2$ is omitted, reproduction can be made without impairing the property of the mesh point original. In the case when the original is not of mesh points, reproduction of the intermediate tone is possible since the above-mentioned dither processing is performed.

In the case where there is an original partially of mesh points, it is sufficient to perform both the first and second mode mentioned above and to monitor the output on CRT monitor and select the better one.

Since in many cases very fine mesh points cannot be understood by the mere glimpse of the original it is possible to select the better one by selecting the means for making the mode two values. It is unnecessary for the threshold value of the two values of the first mode to be always constant, and it is possible to vary it properly corresponding to the density of the texture of the original. In the second mode, although the threshold value for two values is in predetermined order by a systematic method, it can be switched at random. Moreover, although in this example a one-dimensional solid-state imaging device is used as the photoelectric converting means, it is naturally allowed to use a two-dimensional imaging device or other photoelectric converting means.

What I claim is:
1. A copying machine comprising:
means for photoelectrically converting an original image;

means for generating reference density signals;

means for performing analog-to-digital conversion of a signal produced by said photoelectric conversion means based on reference signals from said reference density signal generating means;

threshold signal allotment means which generates threshold signals for performing a binary coding process on the signal converted by said A/D conversion means sequentially in synchronism with a picture element read by said photoelectric conversion means;

manual input means for selecting said threshold signal by controlling said threshold signal allotment means; and means for putting out a reproduced signal in accordance with the said selected threshold signal and the converted signal from said analog-to-digital conversion means in order to obtain a copy having a desired tone, wherein the binary coding process includes dither conversion of the image data to reproduce a half tone image.

2. A copying machine as set forth in claim 1, in which said reference signal generating means receives and holds reference-black and reference-white signals from said photoelectric conversion means.

3. A copying machine as set forth in claim 1, in which said threshold signal allotment means generates desired dither matrix element data serially and periodically in synchronism with a picture element.

4. An image reproducing device comprising:

scanning means for scanning an original image, said scanning means including photoelectric conversion means to photoelectrically convert the original image;

reference density signal generating means which generates reference-black and reference-white signals from said phototelectric conversion means on the basis of a first scan by said scanning means;

means for performing analog-to-digital conversion of a signal generated by said photoelectric conversion means in a second scan by said scanning means within the range of reference-black and white from said reference density signal generating means;

means for generating threshold signals for binary coding of the signal from said photoelectric conversion means; and means for putting out a binary coded reproduction signal in accordance with the threshold signal from said threshold signal generating means and the converted signal from said analog-to-digital conversion means.

5. An image reproducing device comprising:

means for performing photoelectric conversion of an original image;

means for performing analog-to-digital conversion of a signal converted by said photoelectric conversion means;

means for generating threshold signals and sequentially changing the threshold signals for binary coding of the converted signal from said photoelectric conversion means in order to provide a signal representative of a half tone with the binary signal, wherein said threshold generating and changing means generates a threshold signal for binary coding in synchronism with a pixel read out by said photoelectric conversion means;

manual key input means for arbitrarily selecting threshold levels of the threshold signals sequentially generated from said threshold signals generated from said threshold generating and changing means; and means for putting out a reproduced signal in accordance with said threshold generating and changing means and said analog-to-digital conversion means in order to reproduce an image having a half tone.

6. An image reproducing device as set forth in claim 3, in which said analog-to-digital conversion means converts a signal from said photoelectric conversion means based on reference light and shade signals.

7. An image reproducing device as set forth in claim 5, further comprising means to enable levels and allotment of the threshold signals by said threshold generating and changing means to be arbitrarily selected 8. An image reproducing device as set forth in claim 5, in which the levels or their allotment of the threshold signals by said threshold generating and changing means is automatically set by preliminary scanning or the original.

9. An image reproducing device as set forth in claim 5 in which a portion of the original is reproduced without provision of light and shade.

10. An image processing device according to claim 1 wherein said means for putting out a reproduced signal has a first mode which performs dither conversion for half tone image formation and a second mode which reproduces no half tone image, and said selection means is capable of selecting threshold signals each having the same value to reproduce no half tone image.

11. An image reproducing device according to claim 4, wherein said threshold signal genrating means generates a threshold signal for binary coding in synchronism with a pixel read out by said photoelectric conversion means.

12. An image reproducing device according to claim 4, wherein the threshold signals generated by said threshold signal generating means are determined on the basis of the first scan of said scanning means.

13. An image reproducing device according to claim 5 wherein said selection means is capable of selecting threshold signals each having the same value to reproduce no half tone image.

14. An image reproducing device comprising:

means for photoelectric conversion of the original image;

threshold signal generating means for generating a threshold signal which has a timewise constant threshold or a threshold sequentially changing over to provide a binary coding of the converted signal from said photoelectric means;

means for processing an output from said photoelectric conversion means, said processing means having a first mode which converts an output of said photoelectric conversion means into a binary signal in response to said constant threshold signal, a second mode which converts the output of said photoelectric conversion means into a binary signal in response to said sequentially changed over threshold signal, and a third mode which reproduces a half tone image, said third mode performing conversion of the output from said photoelectric conversion means to a binary signal by utilizing a threshold signal different from that in said second mode; and means, including manual key input means, for selecting one of said first, second, and third modes by employing said manual key input means.

15. An image reproducing device according to claim 14 wherein said threshold signal generating means generates a threshold signal for binary coding in synchronism with a pixel read out by said photoelectric conversion means.

16. An image processing device comprising:
photoelectric conversion means for providing photoelectric conversion of an original image;
A/D converter means for perfomring analog-to-digital conversion of image data read out by said photoelectric conversion means;
threshold signal allotment control means adapted for dither conversion and half tone image formation, said threshold signal allotment control means sequentially generating threshold signals to perform a binary coding of the image data converted by said A/D converter means, wherein each of said threshold signals is automatically determined in accordance with the original image; and
reproduction signal generating means for generating reproduction signals in accordance with the threshold signals from said threshold signal allotment control means and the image data converted by said A/D converter means,
wherein said threshold signal allotment means has a first mode which automatically determines a threshold signal in accordance with the original image, and a second mode which manually determines an arbitrary one of plural threshold signals.

17. An image processing device according to claim 16 wherein said threshold signal allotment control means determines the threshold signals to be generated by means of a preliminary scanning of the original image.

18. An image processing device according to claim 16 further comprising reference signal generating means for generating a reference signal in accordance with the original image, wherein said A/D converter means performs A/D conversion of the image read out by said photoelectric conversion means based on said reference signal.

19. An image processing device according to claim 18 wherein said reference signal generating means receives and holds a peak-value of the photoelectrically converted original signal.

20. An image processing device according to claim 16 further comprising means for monitoring said reproduction signals.

21. An image processing device according to claim 16 wherein said threshold signal allotment control means generates the threshold signals for binary coding in synchronism with the image data read out by said photoelectric conversion means.

22. An image processing device comprising:
photoelectric conversion means for providing photoelectric conversion of an original image,
A/D converter means for performing analog-to-digital conversion of image data read out by said photoelectric conversion means;
threshold signal generating means for sequentially generating threshold signals to perform dither conversion of the image data converted by said A/D converter means;
reproduction signal generating means for generating reproduction signals in accordance with the threshold signals and the image data converted by said A/D converter means; and
manual input means for instructing a density of the reproduction image said manual input means including key input means for permitting a selection of the threshold signals;
wherein said device has a first mode which performs dither conversion to reproduce a first half tone image, a second mode which performs dither conversion to reproduce a second half tone image and a third mode which uses threshold signals each having the same value to reproduce no half tone image, and said first, second and third modes are selected in accordance with said key input means.

23. An image processing device according to claim 22 further comprising reference signal generating means for generating a reference signal, wherein said A/D converter means performs A/D conversion of the image read out by said photo-electric conversion means based on said reference signal.

24. An image processing device according to claim 23 wherein said reference signal generating means determines the reference signal by means of a preliminary scanning of the original image.

25. An image processing device according to claim 22 further comprising means for monitoring the reproduction signals.

26. An image processing device according to claim 22 wherein said manual input means causes the allotment of the threshold signals by said threshold signal generating means to be changed.

27. An image processing device according to claim 22 wherein said threshold signal generating means generates the threshold signals for binary coding in synchronism with the image data read out by said photoelectric conversion means.

28. An image processing device comprising:
photoelectric conversion means for providing photoelectric conversion of an original image;
manual designation means for designating a desired area of said original image, said manual designation means including a keyboard for designating the area of the original image; and
control signal generating means for generating control signals for binary coding of image data read out by said photoelectric conversion means, wherein said control signals differ according to the area designated by said manual designation means, and wherein the binary coding process includes dither conversion of the image data to reproduce a half tone image.

29. An image processing device according to claim 28 wherein said control signal generating means sequentially generates threshold signals in synchronism with said photoelectric conversion means.

30. An image processing device according to claim 29 wherein said control signal generating means sequentially generates a determined level of threshold signals in accordance with the related area of the original image.

31. An image processing device according to claim 28 wherein said control signal generating means has instruction means for timely generation of a determined level of threshold signals in accordance with the related area of the original image.

32. An image processing device comprising:
scanning means for scanning an original image, said scanning means including photoelectric conversion means for providing photoelectric conversion of the original image;
control signal generating means for generating a control signal, said control signal being determined by a maximum peak-value and a minimum peak-value of the original image which are obtained in a first scan of the original image by said scanning means;

binary coding means for providing binary coding of image data read out by said photoelectric conversion means on the basis of a second scan of the original image by said scanning means, said binary coding means performing a binary coding process of the image data on the basis of the control signal.

33. An image processing device according to claim 32 wherein said binary coding means has A/D converting means for performing analog-to-digital conversion of the image data, and said control signal determines A/D conversion area of said A/D converting means.

34. An image processing device according to claim 32, wherein said binary coding means includes dither conversion means for dither conversion of the image data, and thresholds for dither conversion by said dither conversion means are determined on the basis of the first scan of said scanning means.

35. An image processing device comprising:
photoelectric conversion means for providing photoelectric conversion of an original image;
A/D converter means for performing analog-to-digital conversion of image data read out by said photoelectric conversion means; and
binary coding means for providing binary coding of the digital image data from said A/D converter means, wherein said binary coding means includes dither converter means for performing dither conversion of digital image data from said A/D converter means to reproduce a half tone image and includes manual key input means for inputting code signal to said dither converter means to control said dither conversion, wherein said binary coding means further including a first mode which performs dither conversion to reproduce a half tone image and a second mode which reproduces no half tone image, and said first and second modes are selectable in accordance with said manual key input means.

36. An image processing device comprising:
photoelectric conversion of an original image;
A/D converter means for performing analog-to-digital conversion of image date read out by said photoelectric conversion means; and
binary coding means for providing binary coding of the digital image data from said A/D converter means,
said binary coding means including dither converter means for performing dither conversion of digital image data from said A/D converter means to reproduce a half tone image, and
said binary coding means having a first mode which controls said dither conversion in accordance with a signal of the original image, and a second mode which manually determines said control for dither conversion;
wherein said dither conversion comprises a plural of dither conversion parameters and in said second mode, an arbitrary one of said plural dither conversion parameters is manually determined.

37. An iamge processing device comprising:
generating means for generating image data;
encoding means for encoding the image date from said generating means; and
instruction means for selectively instructing said encoding means to operate in a first mode in which said encoding is performed in accordance with manually selected control signals or a second mode in which said encoding is performed in accordance with control signals determined automatically in accordance upon the generated image data, said control signals being employed to halftone-process the image data;
wherein in said first mode, an arbitrary one of said control signals can be manually determined.

38. An image processing device according to claim 31 wherein said encoding means comprises dither conversion means for performing dither conversion of said image data, the conversion signals of said dither conversion means being changeable.

39. An image processing device according to claim 34 including means for scanning an original image to provide said image data.

40. An image processing device comprising:
photoelectric conversion means for providing photoelectric conversion of an original image; and
binary coding means for providing binary coding of image data read out by said photoelectric conversion means, wherein said binary coding means includes dither converter means, said dither convertor means including a first mode which reproduces a first half tone image, a second mode which reproduces a second half tone image and a third mode which reproduces no half image and said first, second or third mode is selectable.

41. An image processing device comprising:
photoelectric conversion means for providing photoelectric conversion of an original image;
half tone processing means for half tone processing of image data read out by said photoelectric conversion means; and
manual input means including key input means for instructing a half tone density of a reproduction image,
wherein said half tone processing said half tone processing means includes a parameter to reproduce the desired half tone density of the image, the parameter is selectable in accordance with said manual key input means.

42. An image processing device according to claim 41 wherein said binary process means has a first mode which performs dither conversion to reproduce a first half tone image, a second mode which performs dither conversion to reproduce a second half tone image and a third mode which reproduces no half tone image, and said first, second and third modes are selected in accordance with said manual key input means.

43. An image processing device comprising:
photoelectric conversion means for providing photoelectric conversion of an original image;
A/D converter means for performing analog-to-digital conversion of image data read out by said photoelectric conversion means;
manual designation means including manual key input means for designating a desired area of said original image by employing said manual key input means; and
binary coding means for providing binary coding of digital image data from said A/D converter means, wherein the binary coding mode of said binary coding means differs according to the area designated by said manual key input means and wherein the binary coding mode includes a dither conversion mode to perform dither conversion of the digital image data to reproduce a half tone image.

44. An image processing device comprising:
generating means for generating image data;
encoding means for encoding the image data from said generating means, said encoding means including dither conversion means for performing dither conversion of the image data, said dither conversion means being selectively operable in first and second modes for producing different half-tone images, and a third mode for producing an image having no half-tones;
manual key input means for selecting said first, second and third modes; and
manual designating means for designating a desired area of an original image, wherein said generating means includes means for converting the original image into said image data, and the modes in which said dither conversion means is operable are selected in accordance with the area designated by said manual designating means.

45. An image processing device comprising:
photoelectric conversion means for providing photoelectric conversion of an original image;
manual key designation means for manually designating a desired area of said original image; and
generating means for generating reproduction signals for image reproduction in accordance with image data read out by said photoelectric conversion means, wherein reproduction signal generating modes in said generating means differ according to the area designated by said manual key designation means and wherein the reproduction signal generating modes include a mode for half-tone processing of the image data to reproduce a half-tone image.

46. A device according to claim 45, wherein said generating means is selectively operable in a first said mode for reproducing a half-tone image, a second said mode for reproducing a different half-tone time, or a third said mode for reproducing an image having no half-tones.

47. A device according to caim 46, further comprising manual key input means for selecting the first, second or third mode, wherein a threshold signal for generating the image reproduction signals is selectable by said manual key input means.

48. An image processing device comprising:
photoelectric conversion means for providing photoelectric conversion of an original image; and
generating means for generating reproduction signals for image reproduction in accordance with image data read out by said photoelectric conversion means, said generating means having a first mode in which threshold signals for controlling the reproduction signals are automatically determined in accordance with the original image and a second mode in which an arbitrary one of the threshold signals can be manualy determined.

49. A device according to claim 48, wherein said generating means determines the threshold signal in the first mode by prelimarily scanning the original image.

50. A device according to claim 49, wherein said generating means is selectively operable in a first mode for reproducing a half-tone image, a second said mode for reproducing a different half-tone image, or a third said mode for reproducing an image having no half-tones, wherein said device further comprises manual key input means for selecting the first, second or third mode and wherein the threshold signal is selectable by said means key input means.

51. An image processing device comprising:
photoelectric conversion means for providing photoelectric conversion of an original image;
generating means for generating reproduction signals for image reproduction in accordance with image data read out from said photoelectric conversion means; and
manual key input means for maunally selecting a threshold signal;
wherein said generating means generates the image reproduction signals by utilizing said manual key input means; said generating means has a first mode for performing a half-tone process to reproduce a first half-tone image, a second mode for performing a half-tone process to reproduce a second half-tone image different from the first half-tone image, and a third mode for reproducing a non-half-tone image; and each of said first, second and third modes are selected by said manual key input means, wherein different threshold signals are used in said first, second and third modes, respectively.

* * * * *

UNITED STATES PATENT AND TRADEMARK OFFICE
CERTIFICATE OF CORRECTION

PATENT NO. : 4,812,910

DATED : March 14, 1989

INVENTOR(S) : YUTAKA KOMIYA

It is certified that error appears in the above-identified patent and that said Letters Patent is hereby corrected as shown below:

COLUMN 1, line 56, "signal" (first occurrence) should read --signals--.

COLUMN 2, line 28, "Sometimes" should read --Sometimes,--;

line 32, "of" should be deleted;

line 33, "and" should read --or--.

COLUMN 5, line 45, "valves" should read --values--.

COLUMN 6, line 29, "whilte" should read --while--;

line 52, "110." should read --110).--.

COLUMN 8, line 2, "is" (first occurrence) should read --its--.

COLUMN 9, line 20, "portions." should read --portion.--.

COLUMN 11, line 14, "simiarly" should read --similarly--;

line 47, "clcok" should read --clock--.

COLUMN 12, line 22, "values" should read --value--;

line 23, "value" should read --values--; same line,

UNITED STATES PATENT AND TRADEMARK OFFICE
CERTIFICATE OF CORRECTION

PATENT NO. : 4,812,910

DATED : March 14, 1989

INVENTOR(S) : YUTAKA KOMIYA

It is certified that error appears in the above-identified patent and that said Letters Patent is hereby corrected as shown below:

"older" should read --order--.

COLUMN 13, line 37, "phototelectric" should read --photoelectric--.

COLUMN 14, line 9, "3," should read --5,--;

line 19, "or" should read --of--;

line 24, "An image processing device" should read --A copying machine--;

line 32, "genrating" should read --generating--;

COLUMN 15, line 9, "perfomring" should read --performing--;

line 68, "image" should read --image,--.

COLUMN 17, line 45, "image date" should read --image data--;

line 59, "plural" should read --plurality--;

line 65, "image date" should read --image data--.

COLUMN 18, line 10, "claim 31" should read --claim 37--;

line 15, "claim 34" should read --claim 37--;

line 25, "tor" should read --ter--;

line 28, "half" should read --half tone--;

line 39, "said" (second occurrence) should read --of said--.

UNITED STATES PATENT AND TRADEMARK OFFICE
CERTIFICATE OF CORRECTION

PATENT NO. : 4,812,910

DATED : March 14, 1989

INVENTOR(S) : YUTAKA KOMIYA

It is certified that error appears in the above-identified patent and that said Letters Patent is hereby corrected as shown below:

COLUMN 19, line 43, "time," should read --image,--;

line 46, "caim" should read --claim--.

COLUMN 20, line 14, "manualy" should read --manually--;

line 17, "prelimarily" should read --preliminarily--;

line 20, delete "said";

line 22, delete "said"' line 26, "means" (first occurrence) should read --manual--;

line 34, "maunally" should read --manually--.

Signed and Sealed this

Seventh Day of November, 1989

*Attest:*

JEFFREY M. SAMUELS

*Attesting Officer*    *Acting Commissioner of Patents and Trademarks*